Jan. 15, 1963
J. M. TRACY
3,073,641
VEHICLE FENDER AND MOUNTING ASSEMBLY
Filed Nov. 20, 1959
2 Sheets-Sheet 1
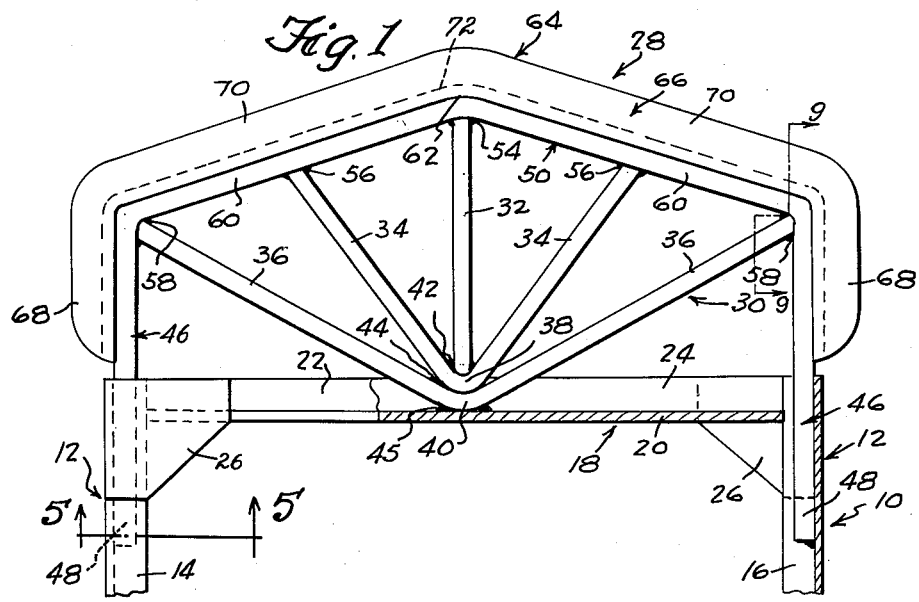
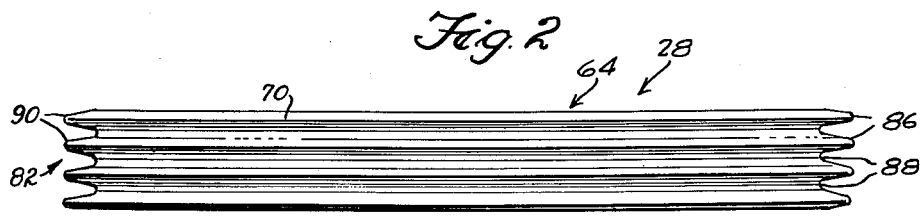
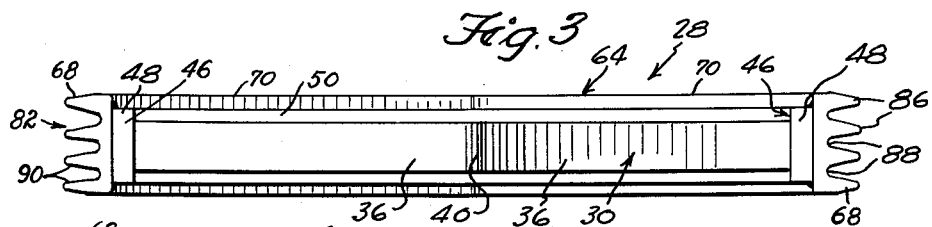
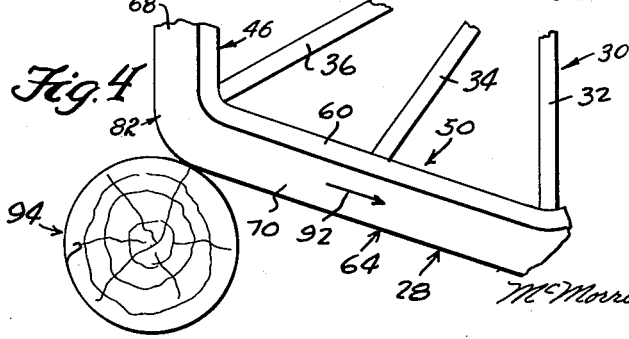
INVENTOR.
John M. Tracy
BY
McMorrow, Berman + Davidson
ATTORNEYS

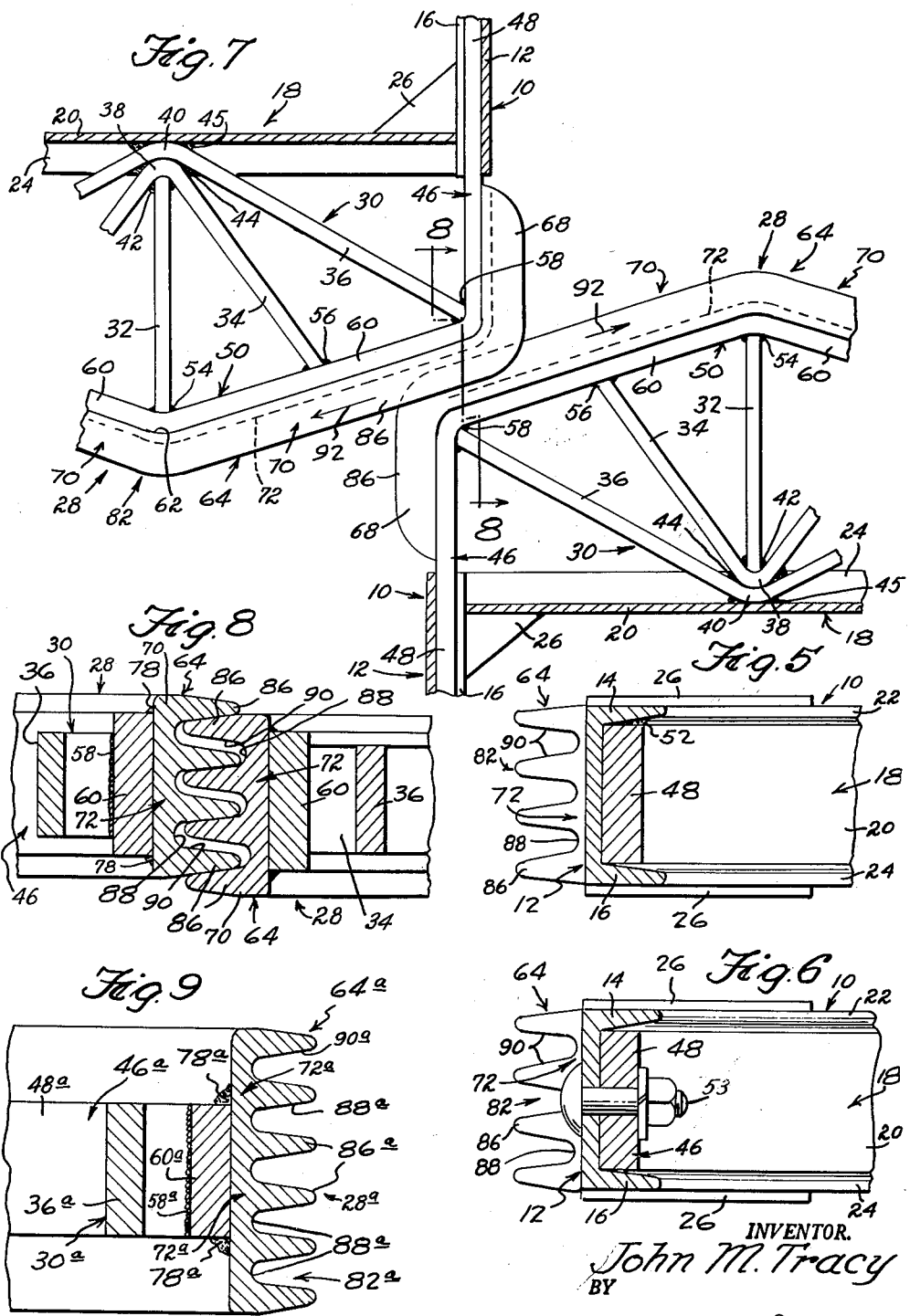

United States Patent Office 3,073,641
Patented Jan. 15, 1963

3,073,641
VEHICLE FENDER AND MOUNTING ASSEMBLY
John M. Tracy, 102 Prospect St., New Britain, Conn.
Filed Nov. 20, 1959, Ser. No. 854,507
4 Claims. (293—48)

This invention relates to novel safety deflection bumpers for vehicles.

The primary object of the invention is to provide vehicle bumpers of the kind indicated which provide greater than normal resistance to personal injury to drivers and passengers of vehicles involved in head-on and rear-end collisions with other vehicles or with obstructions, such as roadside posts, culverts, trees, and the like; and greater than normal resistance to damage to the vehicles from such causes.

Another object of the invention is to provide bumpers of the character indicated above which have extra strength and extra rigid collision shock resistant and absorbent mountings to vehicle chassis frames, which are disposed and arranged to have sufficient resilience to absorb collision shocks to the extent of substantially diminishing or preventing the injuries to drivers and passengers which would otherwise be expected.

A further object of the invention is to provide bumpers of the character indicated above whose bars are U-shaped in plan and have rearwardly and laterally outwardly angled arms which serve, upon collision contact with similar bumpers or other vehicles, or any other forms of bumpers thereto, or upon collision contact with an obstruction, such as a tree, post, or culvert, to deflect and absorb the force of straight-line collisions on vehicles having my collision resistant bumpers, by translating a major part of the collision force at an angle to the line of collision and outwardly along the angled arm struck, in a manner to move the vehicle sidewise sufficiently to obtain the shock absorbing and braking benefit of the frictional contact of the vehicle's tires with the road surface and sliding thereon in such direction.

A still further object of the invention is to provide bumpers of the character indicated above, wherein the outer or contact surfaces of the bumper bar arms are horizontally fluted, so as to provide outstanding spaced ribs and intervening grooves, together with massive rigid backing or reinforcement thereof, which grooves and ribs act, in conjunction with the features outlined above, to prevent climbing of the bumpers of colliding vehicles over each other and interlocking of the bumpers, the grooves and ribs being tapered and the grooves being wider than the ribs, so that such bumpers on colliding vehicles cannot become interlocked, and free sliding of engaged bumper bar arms, for the benefits outlined above, is provided for, and so that the colliding vehicles are moved laterally away from each other.

Other important objects and advantageous features of the invention will be apparent from the following description and the accompanying drawings, wherein, for purposes of illustration only, a specific form of the invention is set forth in detail.

In the drawings:

FIGURE 1 is a fragmentary top plan view, partly broken away and in section, showing a bumper of the present invention mounted on an end of a vehicle chassis frame;

FIGURE 2 is a front or outer side elevation of a bumper of the invention;

FIGURE 3 is an inner side or rear elevation of said bumper, removed from the chassis frame;

FIGURE 4 is a schematic and fragmentary top plan view showing an arm of said bumper in collision contact with a tree trunk, with arrows showing resultant deflection away from the tree trunk;

FIGURE 5 is an enlarged fragmentary vertical transverse section taken on the line 5—5 of FIGURE 1;

FIGURE 6 is a view similar to FIGURE 5, showing bolted reinforcement for the bumper bar;

FIGURE 7 is a schematic plan view, partly broken away and in section, showing two head-on colliding vehicles equipped with bumpers of the present invention, bumper bar arms at adjacent sides of the vehicles being in sliding and interengaged contact with each other, with arrows showing the resultant lateral deflections of the vehicles away from each other;

FIGURE 8 is an enlarged fragmentary vertical section taken on the line 8—8 of FIGURE 7; and FIGURE 9 is a fragmentary vertical transverse section taken on the line 9—9 of FIGURE 1, showing another form of the bumper of this invention, having a wider bumper bar, and heavier mounting means.

Referring in detail to the drawings, wherein like and related numerals designate like and related parts throughout the several views, and first to FIGURES 1 to 8, the numeral 10 generally designates a motor vehicle chassis frame end, comprising channel side members 12, having upper and lower flanges 14 and 16, respectively, and being spaced and connected at their ends by an outwardly opening channel cross member 18. The cross member 18 has a vertical web 20, and upper and lower flanges 22 and 24, respectively, and corner braces 26 extend between the cross member and the side member at the corners of the frame end 10.

In accordance with the present invention, a safety deflector bumper assembly, generally designated 28, is fixedly mounted on and extends longitudinally outwardly from the chassis frame end 10, whether the front or the rear end, in the horizontal plane thereof.

The bumper assembly 28 comprises a collision shock-resistant and absorbent horizontal mounting frame 30, which is composed of extra heavy flat steel bar stock, and comprises a center longitudinal bar 32, at opposite sides of which are intermediate bars 34 and outer bars 36. The intermediate and outer bars 34 and 36 are symmetrically angularly spaced laterally outwardly from the center bar 32, in a fan-shaped arrangement. As shown in FIGURE 1, the intermediate bars 34 are integral with each other at their inward ends, as indicated at 38, and the outer bars 36 are integral with each other at their inward ends, as indicated at 40. The inward end of the center bar 32 is welded, as indicated at 42, to the outward side of the junction of the intermediate bars 34, and the junction 38 of the intermediate bars is welded, as indicated at 44, to the outward side of the junction 40 of the outer bars 36; and the assembly of junctions is located between the upper and lower flanges 22 and 24 of the chassis frame cross member 18 and the junction 40 welded, as indicated at 45, to the cross member web 20.

The mounting frame 30 further comprises an integral horizontal U-shaped member 46, having straight inwardly extending legs 48, and a V-shaped bight portion 50, the legs 48 being positioned in the channel side members 12 of the chassis frame end 10 and welded in place therein, as indicated at 52, or bolted, as indicated at 53 in FIGURE 6. The outward end of the center bar 32, and the outer ends of the intermediate bars 34 and of the outer bars 36 are welded to the inward side of the bight portion 50 and to the legs 48, as indicated at 54, 56, and 58, respectively. The arms 60 of the V-shaped bight portion 50 are similarly angled laterally outwardly and longitudinally inwardly from an apex 62, at relatively small deflection angles.

Fixed to the outward side of the bight portion 50 and portions of the legs 48 is a non-locking bumper bar 64 which has a V-shaped bight portion 66 and straight parallel longitudinally inwardly extending legs 68, following the contours of the U-shaped member 46 of the mounting frame 30. The bight portion 66 of the bumper bar 64 has deflection angled arms 70. As shown in FIGURE 5, the bumper bar 64 is of heavy, solid construction and has a vertical web 72 extending along the outward sides of related portions of the U-shaped frame 46, and fixed to the outward side of the frame 46, as by weldings 78, with the bumper bar 64 projecting slightly above and below the frame 46, as shown in FIGURE 8.

Suitably fixed or formed integral on the outward side of the bumper bar web 72, and extending the length thereof, is a horizontally fluted form 82, which is preferably integral with the web 72, the bumper bar 64 being preferably an extruded metal form. The form 82 comprises vertically spaced, outwardly extending, outwardly tapered ribs 86, which are vertically spaced from each other at distances greater than their thicknesses or cross-sections, so that the ribs 86, on a similar bumper bar 64 on another colliding vehicle, cannot lock in the grooves 88 between adjacent ribs, and the bumper bars cannot ride over or under each other with their ribs interengaged, as shown in FIGURES 7 and 8.

The grooves 88, besides being wider than the ribs 86, have outwardly divergent sides 90 which serve to cam the ribs 86 of the bumper bar of a colliding vehicle deep into the grooves 88 for secure interengagement of the bumper bars, while leaving the ribs 86 free to slide in the grooves for relatively frictionless deflecting or camming of the vehicles laterally away from each other, as indicated by an arrow in FIGURES 4 and 7. This designedly produces the desired translation and absorption of collision shock, which is further absorbed and reduced in its impact upon the structures of the colliding vehicles and their passengers by the lateral sliding upon the road surface of the tires of the vehicles, as the vehicles are deflected laterally away from each other. This same deflection takes place when a bumper arm 70 strikes a fixed obstruction, such as a tree trunk 94, as shown in FIGURE 4.

While the bumper bar 64 of FIGURES 1 to 8, involve four ribs 86 and three grooves 88 therebetween, a wider bumper bar 64a, shown in FIGURE 9, wherein the components corresponding in structure and function to those shown in FIGURES 1 to 8 are identified by similar numerals have the letter "a" added thereto, may be provided where substantial differences in the bumper heights, above the pavement, are expected to be encountered with accompanying risks of over-riding and under-riding. In such case, the bumper bar 64a is made substantially wider than the bumper bars of FIGURES 1 to 8, is fixed, as indicated at 78a, at its midlength to the outward side of the mounting frame member 46a, so as to extend equally thereabove and therebelow, and the form 82a provided with a greater number of ribs 86a and ribs 88a, such as six ribs and five grooves. In this case, the mounting frame 30a and the member 46a are preferably of heavier and stronger bar stock.

While there have been shown and described herein preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a vehicle chassis frame having side members having terminal ends, a rigid cross member extending between and fixed to said side members at their ends, a U-shaped mounting frame member having a rigid bight portion and rigid legs, said legs extending along and within the chassis frame members and being directly fixed to the chassis frame side members with said bight portion spaced outwardly from said cross member, said bight portion being V-shaped and having an apex at the middle thereof, a shock absorbent frame extending between said bight portion and said frame cross member and fixed thereto, and a rigid U-shaped bumper bar having a V-shaped bight portion affixed to and coextensive with the bight portion of the mounting frame, said bumper bar having legs extending along and secured to the outer sides of the legs of the mounting frame.

2. In combination, a vehicle chassis frame having side members having terminal ends, a rigid cross member extending between and fixed to said side members at their ends, a U-shaped mounting frame member having a rigid bight portion and rigid legs, said legs extending along and within the chassis frame members and being directly fixed to the chassis frame side members with said bight portion spaced outwardly from said cross member, said bight portion being V-shaped and having an apex at the middle thereof, a shock absorbent frame extending between said bight portion and said frame cross member and fixed thereto, and a rigid U-shaped bumper bar having a V-shaped bight portion affixed to and coextensive with the bight portion of the mounting frame, said bumper bar having legs extending along and secured to the outer sides of the legs of the mounting frame, said shock absorbent frame comprising a central longitudinal bar fixed to the apex of the mounting frame bight portion and to the middle of said cross member, and pluralities of other bars fixed at their inner ends to the middle of said cross member and at their other ends to the bumper bar bight portion, at spaced points therealong and at opposite sides of said central bar.

3. In combination, a vehicle chassis frame having side members having terminal ends, a rigid cross member extending between and fixed to said side members at their ends, a U-shaped mounting frame member having a rigid bight portion and rigid legs, said legs extending along and within the chassis frame members and being directly fixed to the chassis frame side members with said bight portion spaced outwardly from said cross member, said bight portion being V-shaped and having an apex at the middle thereof, a shock absorbent frame extending between said bight portion and said frame cross member and fixed thereto, and a rigid U-shaped bumper bar having a V-shaped bight portion affixed to and coextensive with the bight portion of the mounting frame, said bumper bar having legs extending along and secured to the outer sides of the legs of the mounting frame, said bumper bar bight portion comprising a vertical web having thereon outwardly extending vertically spaced ribs, said ribs extending the length of the bumper bar bight portion, said ribs being tapered in cross section.

4. In combination, a vehicle chassis frame having side members having terminal ends, a rigid cross member extending between and fixed to said side members at their ends, a U-shaped mounting frame member having a rigid bight portion and rigid legs, said legs extending along and within the chassis frame members and being directly fixed to the chassis frame side members with said bight portion spaced outwardly from said cross-member, said bight portion being V-shaped and having an apex at the middle thereof, a shock absorbent frame extending between said bight portion and said frame cross member and fixed thereto, and a rigid U-shaped bumper bar having a V-shaped bight portion affixed to and coextensive with the bight portion of the mounting frame, said bumper bar having legs extending along and secured to the outer sides of the legs of the mounting frame, said bumper bar bight portion comprising a vertical web having thereon outwardly extending vertically spaced ribs, said ribs extending the length of the bumper bar bight portion, said ribs being tapered in cross section, said ribs being continued inwardly along the outer sides of the legs of the bumper bar.

References Cited in the file of this patent

UNITED STATES PATENTS

| | | |
|---|---|---|
| 547,321 | Black et al. | Oct. 1, 1895 |
| 1,515,424 | Stafford | Nov. 11, 1924 |
| 1,800,142 | Heagney | Apr. 7, 1931 |
| 2,519,429 | Brandvold | Aug. 22, 1950 |
| 2,604,349 | Martinetz | July 22, 1952 |
| 2,610,881 | Schuettpelz | Sept. 16, 1952 |
| 2,873,994 | Omps | Feb. 17, 1959 |